US00RE37708E

(19) United States
(12) Reissued Patent
Danstrom

(10) Patent Number: US RE37,708 E
(45) Date of Reissued Patent: May 21, 2002

(54) PROGRAMMABLE BANDWIDTH VOLTAGE REGULATOR

(75) Inventor: Eric J. Danstrom, Palatine, IL (US)

(73) Assignee: STMicroelectronics, Inc., Carrollton, TX (US)

(21) Appl. No.: 09/561,522

(22) Filed: Apr. 28, 2000

Related U.S. Patent Documents

Reissue of:
(64) Patent No.: 5,744,944
Issued: Apr. 28, 1998
Appl. No.: 08/574,609
Filed: Dec. 13, 1995

(51) Int. Cl.[7] ..... G05F 1/40
(52) U.S. Cl. ..... 323/284; 323/274; 323/351; 330/282
(58) Field of Search ..... 323/269, 270, 323/273, 274, 282, 283, 284, 349, 351; 330/86, 110, 278, 282

(56) References Cited

U.S. PATENT DOCUMENTS

| | | | | |
|---|---|---|---|---|
| 4,318,039 A | * | 3/1982 | Abbott | 323/273 |
| 4,366,433 A | * | 12/1982 | Imazeki et al. | 323/281 |
| 4,400,660 A | * | 8/1983 | Schaefer | 323/270 |
| 4,540,952 A | * | 9/1985 | Williams | 330/282 X |
| 4,628,247 A | * | 12/1986 | Rossetti | 323/314 |
| 4,633,162 A | * | 12/1986 | Melbert | 323/275 |
| 4,857,823 A | | 8/1989 | Bitting | 323/314 |
| 4,908,566 A | | 3/1990 | Tesch | 323/280 |
| 4,980,836 A | * | 12/1990 | Carter et al. | 364/483 |
| 5,168,209 A | | 12/1992 | Thiel, V | 323/313 |
| 5,191,278 A | | 3/1993 | Carpenter | 323/275 |
| 5,191,555 A | | 3/1993 | Tabacco et al. | 365/230.08 |
| 5,412,346 A | * | 5/1995 | Burger, Jr. et al. | 330/282 |
| 5,448,156 A | * | 9/1995 | Tsay | 323/312 |
| 5,453,678 A | * | 9/1995 | Bertolini et al. | 323/282 |
| 5,486,791 A | * | 1/1996 | Spitalny et al. | 330/282 |
| 5,548,206 A | * | 8/1996 | Soo | 323/284 |
| 5,648,718 A | * | 7/1997 | Edwards | 323/274 |

FOREIGN PATENT DOCUMENTS

| | | |
|---|---|---|
| EP | 0 531 945 A2 | 3/1993 |
| EP | 0 547 916 A2 | 6/1993 |

OTHER PUBLICATIONS

Grebene, Alan. "Bipolar and MOS Analog Integrated Circuit Design." John Wiley & Sons Publishers. 1984. pp. 706–712.*

Electronique, No. 19, Jun. 1, 1992, pp. 68–72, J. Williams, et al, *La Contre–Reaction En Courant S'Impose A Frequence Elevee.*

Electronic Design, vol. 42, No. 17, Aug. 22, 1994, pp. 123–124, 126, 128, K. O'Malley, *Understanding Linear–Regulator Compensation.*

* cited by examiner

*Primary Examiner*—Jessica Han
(74) *Attorney, Agent, or Firm*—Lisa K. Jorgenson; Bryan A. Santarelli

(57) ABSTRACT

A method for reducing the transient response time of a voltage regulator when the load attached to it is entering or exiting a lower power consumption level by changing the bandwidth of the voltage regulator without compromising its stability, and a bandwidth regulator for implementing such a method are disclosed, wherein the bandwidth of the voltage regulator is changed based on a signal sent by a control device when it senses that the component is about to change power consumption levels.

31 Claims, 4 Drawing Sheets

PROGRAMMABLE BANDWIDTH VOLTAGE REGULATOR

Matter enclosed in heavy brackets [ ] appears in the original patent but forms no part of this reissue specification; matter printed in italics indicates the additions made by reissue.

The present invention relates to the field of integrated circuits, and is more specifically directed to voltage regulators. *This application is a reissue of 08/574,609 filed on Dec. 13, 1995, now U.S. Pat. No. 5,744,944.*

BACKGROUND AND SUMMARY OF THE INVENTION

In order to reduce power consumption many electronic components are now capable of operating at several power consumption levels, one of which is typically a power-down or sleep mode. The power-down mode is a low power consumption level that the component can enter into when it is not performing an operation or being accessed. Reducing the level of power consumption is particularly useful for battery operated devices, such as portable computers, where reducing power consumption increases the battery life, and therefore the time the device can be used without having to either replace or recharge the battery.

A microprocessor consumes a significant amount of power in the full power-up mode, and it is typically accessed only a small portion of the time, therefore it is advantageous to bring the microprocessor into the power-down mode when it is not being accessed. In the power-up mode the microprocessor can draw a current of up to 10 A. In the power-down mode the microprocessor can maintain its state with a current of as little as 100 $\mu$A (i.e. as much as 100,000 times less than in the power-up mode). A power supply, such as a battery, typically supplies the current to the microprocessor through a voltage regulator. The time in which the voltage regulator can go from delivering the proper voltage for the current required in the power-down mode to delivering the proper voltage for the current required in the power-up mode, and vis versa, is the transient response time of the voltage regulator. The large change in current demand of the microprocessor, which is the load of the voltage regulator, may bring the voltage regulator out of regulation during the transient response.

The stability of the voltage regulator is primarily dependent on the size of its compensation capacitor, its load capacitor, and its pass element. The compensation capacitor is the capacitor put in at the gain stage of the voltage regulator to compensate the phase shift of the voltage regulator, and hence prevent oscillation. A larger compensation capacitor increases the stability of the voltage regulator. The size of this capacitor is inversely proportional to the bandwidth of the voltage regulator, and directly proportional to the transient response time of the voltage regulator. The larger the compensation capacitor the more stable the voltage regulator, and, unfortunately, the smaller the bandwidth of the voltage regulator. The smaller bandwidth does not allow the voltage regulator to respond quickly to large changes in current demand, increasing the transient response time.

Additionally, since the stability of the voltage regulator is dependent on the load capacitor as well as the compensation capacitor, as the load capacitor is reduced the voltage regulator becomes less stable. A smaller load capacitor is both easier to use and easier to recycle after the circuit is no longer needed, however it reduces the stability of the voltage regulator. The decrease in the load capacitor can be compensated by an increase in the compensation capacitor to ensure the stability of the circuit. However, as discussed above, an increase in the compensation capacitor reduces the bandwidth of the voltage regulator, and therefore increases its transient response time.

In some configurations proposed circuits have changed the bandwidth of the voltage regulator when the feedback loop of the voltage regulator indicated that the voltage regulator is out of regulation because of the large change in current demand. Alternative proposals have suggested monitoring circuits that could monitor the current demand of the load and notify the voltage regulator after there is a change in the current demand of the load.

A problem with the above methods is that during the time that the change in current demand is going through the feedback loop, or by the time the monitoring circuit detects that the current demand of the load has changed, the load is not receiving the appropriate voltage. The present inventor has observed that another problem is that during the time it takes to detect the change in the current demand the load is not receiving the proper voltage due to the large current demand, the voltage regulator does not know that it is not delivering the required voltage and has not even changed its bandwidth, thus increasing the transient response time by this amount of time.

Further background on voltage regulators and on stability criteria of analog devices can be found in Grebene, Alan B., BIPOLAR AND MOS ANALOG INTEGRATED CIRCUIT DESIGN, John Wiley & Sons, 1984; Gray, Paul R. and Robert G. Meyer, ANALYSIS AND DESIGN OF ANALOG INTEGRATES CIRCUITS, 2nd ed., John Wiley & Sons, 1984; Franklin, Gene F. et al., FEEDBACK CONTROL OF DYNAMIC SYSTEMS, Addison-Wesley Publishing Co., 1986; SGS-THOMSON, Microelectronics, Inc. databooks for voltage regulators, for linear ICs, and for automotive products; and National Semiconductor databooks, datasheets and application notes for voltage regulators, all incorporated herein by this reference.

SUMMARY OF THE INVENTION

The present application discloses methods and circuits for reducing the transient response time of a voltage regulator when the load attached to it is entering or exiting a lower power consumption level, without compromising the stability of the voltage regulator. A control device is connected to both a voltage regulator and a dynamic load. When the control device senses that the dynamic load should change its power consumption level it sends a signal to a regulation means in the voltage regulator to change the bandwidth of the voltage regulator to be able to deliver the required voltage in the shortest possible time. At the same time (or shortly thereafter, depending on the requirements of the system) the control device sends a signal to the dynamic load to change its power consumption level. In one sample embodiment of the invention, after the voltage regulator starts delivering the required voltage the regulating means returns the bandwidth of the voltage regulator to the optimal bandwidth for the dynamic load connected to the voltage regulator.

In one embodiment of the invention the regulating means includes a way of switching the compensation capacitor in or out when the control device signals the voltage regulator to change the bandwidth of the voltage regulator. In another sample embodiment of the invention the regulating means includes a switched capacitor that changes the bandwidth of the voltage regulator when the current demand of the load is about to change.

One advantage of the present invention is that the bandwidth of a voltage regulator can be increased in order to reduce the voltage regulator's transient response, without compromising the voltage regulator's stability.

Another advantage of this invention is that there is no delay time from the time the current requirement of the dynamic load increases until the time the bandwidth of the voltage regulator increases, to allow the voltage regulator to deliver the required voltage faster.

A further advantage of this invention is that it allows a load to enter the power-down mode faster, reducing the power consumed by the load.

Another advantage of this invention is that it allows the use of a smaller load capacitor without compromising the stability of the voltage regulator.

A particularly advantageous use of the current invention is in battery-powered, portable computers. The improved transient response time of the voltage regulator allows aggressive power-conservation strategies in which the microprocessor frequently enters sleep mode.

Other advantages and objects of the invention will be apparent to those of ordinary skill in the art having reference to the following specification together with the drawings.

DETAILED DESCRIPTION OF THE PREFERRED EMBODIMENT

Figure 1:
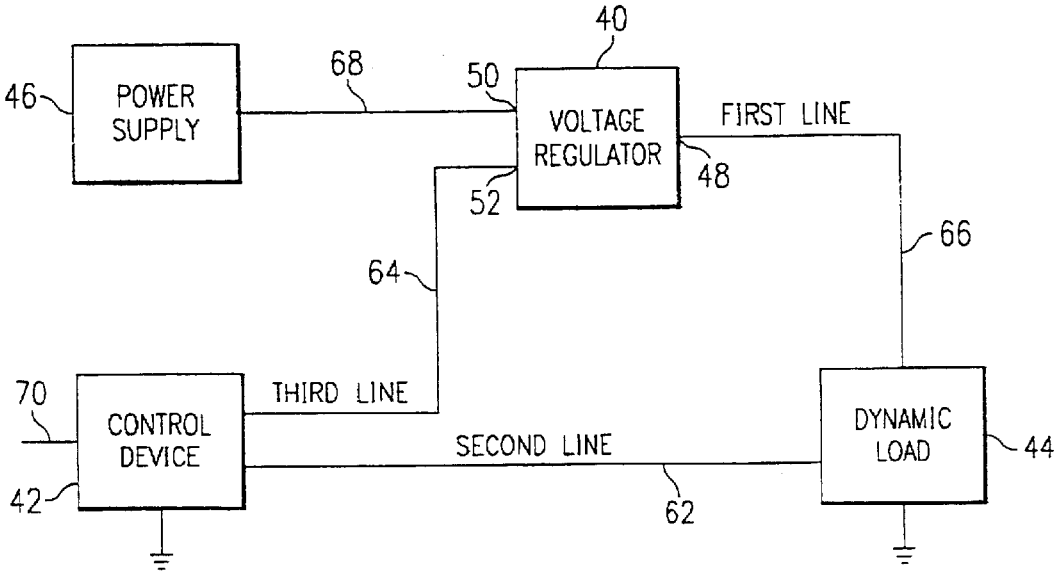
FIG. 1 is a block diagram of a electrical system of the present invention.

Referring to FIG. 1 an electronic system, such as a computer shown in FIG. 2, which uses a power supply including a voltage regulator according to the preferred embodiment of the invention will now be described. A power source 46, such as a battery, supplies a constant unregulated voltage to the voltage regulator 40 through the first input 50 of the voltage regulator. A first line 66 connects the output 48 of the voltage regulator 40 to the first input of a dynamic load 44.

The dynamic load 44 can be any component of the computer that can operate at either of at least two power consumption levels, one of which is preferably a sleep or power-down mode. A microprocessor can be used as a typical dynamic load 44. Many microprocessors now manufactured can operate at both a power-up mode and a power-down mode. Additionally, because microprocessors consume a significant amount of power it is advantageous to bring the microprocessor into a power-down mode when it is not being accessed. The dynamic load 44 (hereinafter referred to as microprocessor 44), has a second input connected via the second line 62 to the first output of a control device 42. A third line 64 connects a second output of the control device 42 to the second input 52 of the voltage regulator 40.

The control device 42 has a sensing means that detects whether the microprocessor 44 needs to be accessed, for example when there is an input on one of the input devices, such as a keystroke, or when the microprocessor needs to access a drive. The sensing means is typically an integrated circuit dedicated to monitoring access to the microprocessor, e.g. such as a keyboard monitoring circuit or an application specific integrated circuit dedicated to monitoring access to the microprocessor, both of which are well known in the art.

Figure 2:
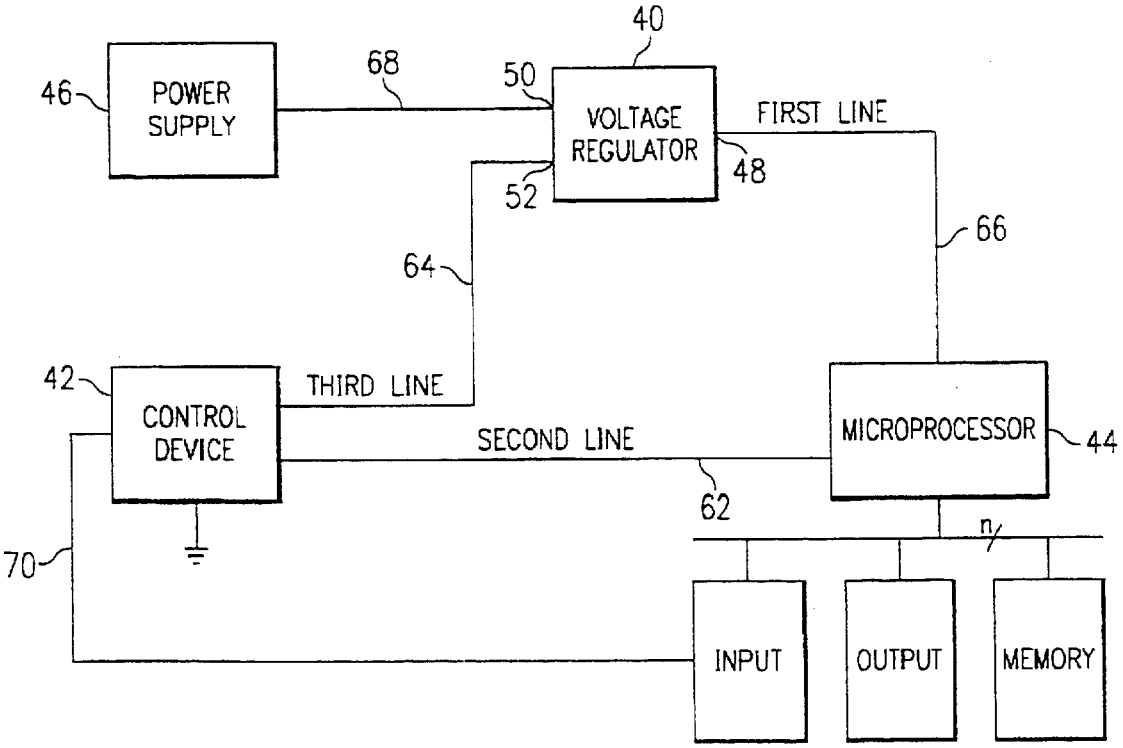
FIG. 2 is a block diagram of a computer.
Figure 3:
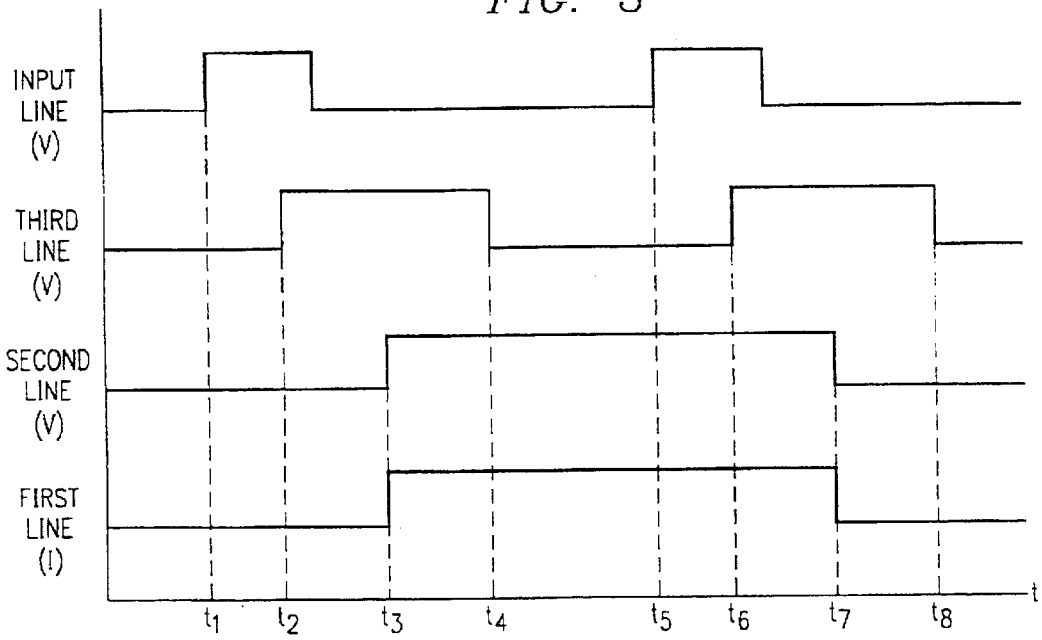
FIG. 3 is a timing diagram of the electrical system of the present invention.

FIG. 3 shows the logic states of the input line 70 to the control device 42 and first 66, second 62, and third 64 lines that connect some of the elements of the electronic system. Referring to FIG. 2 and FIG. 3 simultaneously, one sample operation of the system will now be described. At time $t_1$ the microprocessor 44 is in the power-down mode and one of the components of the computer signals that the microprocessor 44 needs to be accessed. At $t_2$ the sensing means senses that the microprocessor needs to be accessed, typically by a change in the logic state of the input line 70, the third line 64 goes from the first logic state at which it is normally kept, preferably low, to a second logic state, preferably high. This signals the regulating means, connected to the second input 52 of the voltage regulator 40, to change the bandwidth of the voltage regulator 40 from a first bandwidth to a second bandwidth. In the preferred embodiment of the invention, when the dominant pole of the voltage regulator is produced by the compensation capacitor, the second bandwidth is higher than the first bandwidth, although under other circumstances it may be advantageous for the first bandwidth to be higher than the second bandwidth.

The first and second bandwidths are dependent on the desired operation of the voltage regulator 40 and of the microprocessor 44. In the power-down mode the microprocessor 44 draws very little current, in the present technology the microprocessor typically draws 100 $\mu$A in the power-down mode. When the microprocessor 44 wakes up, i.e. exits the power-down mode and powers up, it starts to draw much more current, in modern technology a typical microprocessor may require as much as 10 A. The time period within which the voltage regulator needs to respond to this increase in current, i.e. the transient time, is usually short, on the order of 1 $\mu$sec with current microprocessors. The first bandwidth is chosen based on the desired stability of the voltage regulator, and typically is low. The stability of the voltage regulator 40 is dependent on the compensation capacitor, which is typically 10 pF to 100 pF, and the load capacitor, which is a combination of the capacitance of the microprocessor and any capacitors in parallel with the microprocessor 44 connected to the output of the voltage regulator 40. The capacitance of the microprocessor 44 is typically very small compared to the capacitor in parallel with it and is thus practically negligible. Therefore, the load capacitor can be fairly accurately approximated by the capacitor across the output of the voltage regulator 40, which can typically be between 0.1 $\mu$F to 100 $\mu$F.

A smaller load capacitor is both easier to use and is more environmentally friendly, i.e. easier to recycle after it is not needed, however it reduces the stability of the voltage regulator. The decrease in the load capacitor can be compensated by an increase in the compensation capacitor to ensure the stability of the circuit, i.e. as the load capacitor is reduced the compensation capacitor should be increased.

Unfortunately increasing the compensation capacitor reduces the bandwidth of the voltage regulator, and therefore increases its transient response time. However, since the bandwidth is also dependent on the load capacitor compensation of the load capacitor is typically needed since a small load capacitor produces a higher bandwidth, which may cause instability.

The first bandwidth is chosen to insure the stability of the voltage regulator 40 based on the above relationship of the compensation capacitor and the load capacitor, and also on the capacitance of the passive element of the voltage regulator. For example, the first bandwidth can be on the order of one to several kiloHertz. The second bandwidth is chosen to allow the voltage regulator to quickly respond to the large change of current demand by the microprocessor, thus reducing the transient time. For example, for a current step of five orders of magnitude, described above, with the transient time being about 10 $\mu$sec, the second bandwidth can be in the range of 100 kHz to 1 MHz.

Referring still to FIG. 2 and FIG. 3 simultaneously, at $t_3$, the control device 42 changes the logic state of the second line 62 from the first logic state to the second logic state, signaling the microprocessor 44 to exit out of the power-down mode. This can occur at the same time as the logic state on the third line 64 changes, signaling the voltage regulator 40 to change the bandwidth, making $t_3$ equal to $t_2$, or a short period of time, for example 200 nsec, after the logic state on the third line 64 changes. Although this brings the voltage regulator 40 out of regulation, the microprocessor 44 drawing the higher current produces the same effect and the change in bandwidth allows the voltage regulator 40 to respond to the higher current demand more quickly, thus reducing the amount of time the microprocessor 44 is not getting the required voltage. In the example above the change in bandwidth is from a lower to a higher bandwidth to shorten the transient response time, although in other circumstances the bandwidth can be reduced instead of increased to produce the same effect.

When the voltage regulator 40 starts to deliver the required voltage to the microprocessor 44, at $t_4$, the logic state of the third line 64 goes back to the first logic state. Preferably the control means 42 changes the logic state of the third line 64 back to the first logic state after a known time interval. One skilled in the art can calculate the time interval from $t_2$, the time the microprocessor requires a higher current, until $t_4$, the time at which the voltage regulator starts to deliver the voltage required by the load, based on the bandwidth of the voltage regulator, the load capacitor, the input voltage of the voltage regulator 40, and the properties of the microprocessor 44, such as the rate at which the microprocessor's current demand changes. However, the control means 42 can change the logic state of the third line 64 based on any known means of detecting that the required voltage is being delivered, such as: monitoring the microprocessor 44 through a monitoring circuit that can sense that the microprocessor is receiving the required load, or monitoring the voltage regulator 40 through its feedback loop.

The voltage regulator 40 can now either remain at the second bandwidth or the regulating means can change its bandwidth either back to the first bandwidth, or to a third bandwidth that is optimal for the size of the load capacitor. A larger load capacitor can lower the bandwidth that allows the load to continue drawing the required current and the proper voltage without oscillating. The compensation capacitor of the voltage regulator shifts the position of the pole produced by the load capacitor to increase the stability of the voltage regulator. Therefore, if the compensation capacitor is large enough to compensate for the load, the bandwidth of the voltage regulator 40 can be returned to the first bandwidth, otherwise a second compensation capacitor that would produce a third bandwidth can be selected. The third bandwidth is based on the need for a bandwidth high enough to permit the voltage regulator 40 to deliver the required current and the proper voltage, yet keep the bandwidth as low as possible, to enhance the stability of the voltage regulator 40. Therefore, a second value for the compensation capacitor can be selected to optimize a bandwidth for the size of the load capacitor.

The transition into the power-down mode follows a similar process. The time $t_5$ at which the microprocessor should enter the power-down mode is typically determined through the operating system monitoring the access to the microprocessor and determining that there has been no request to access it for a specific amount of time. At $t_5$ the sensing means of the control device 42 senses that the microprocessor should enter the power-down mode, typically by a change in the logic state of the input line 70 generated by the operating system. At time $t_6$, control device 42 changes the logic state on the third line 64 from the first logic state (preferably low) at which it is normally kept to a second logic state (preferably high). This signals the regulating means, connected to the second input 52 of the voltage regulator, to change the bandwidth of the voltage regulator 40 from the first or third bandwidth at which it is operating to the second bandwidth.

At $t_7$, the control device 42 changes the logic state of the second line 62 from the second logic state to the first logic state, signaling the microprocessor 44 to enter into the power-down mode. This can occur at the same time as the logic state on the third line 64 changes, signaling the voltage regulator 40 to change its bandwidth, making $t_7$ equal to $t_6$, or a short period of time, for example 200 nsec, after the logic state on the third line 64 changes. The higher bandwidth allows the voltage regulator 40 to respond to the reduction in the current demand quicker, reducing the amount of time the microprocessor 44 is getting too much current.

When the voltage regulator 40 starts to deliver the required voltage to the microprocessor 44, at $t_8$, the logic state of the third line 64 goes back to the first logic state. Preferably the control means 42 changes the logic state of the third line 64 back to the first logic state after a known time interval. One skilled in the art can calculate the time interval from $t_6$, when the microprocessor requires a lower current, to $t_8$, the time at which the voltage regulator 40 starts to deliver the proper voltage, based on the same criteria that the interval from $t_2$ to $t_4$ is calculated, i.e. bandwidth of the voltage regulator 40, the load capacitor and the properties of the microprocessor 44. However, this can also be done by any known means of detecting that the current and voltage required by the load are supplied. Some examples such means are: monitoring the microprocessor 44 through a monitoring circuit that can sense that the microprocessor 44 is receiving the required current and voltage, or monitoring the voltage regulator 40 through its feedback loop. The voltage regulator 40 can now either remain at the second bandwidth or the regulating means can change its bandwidth back to the first bandwidth.

Figure 4A:
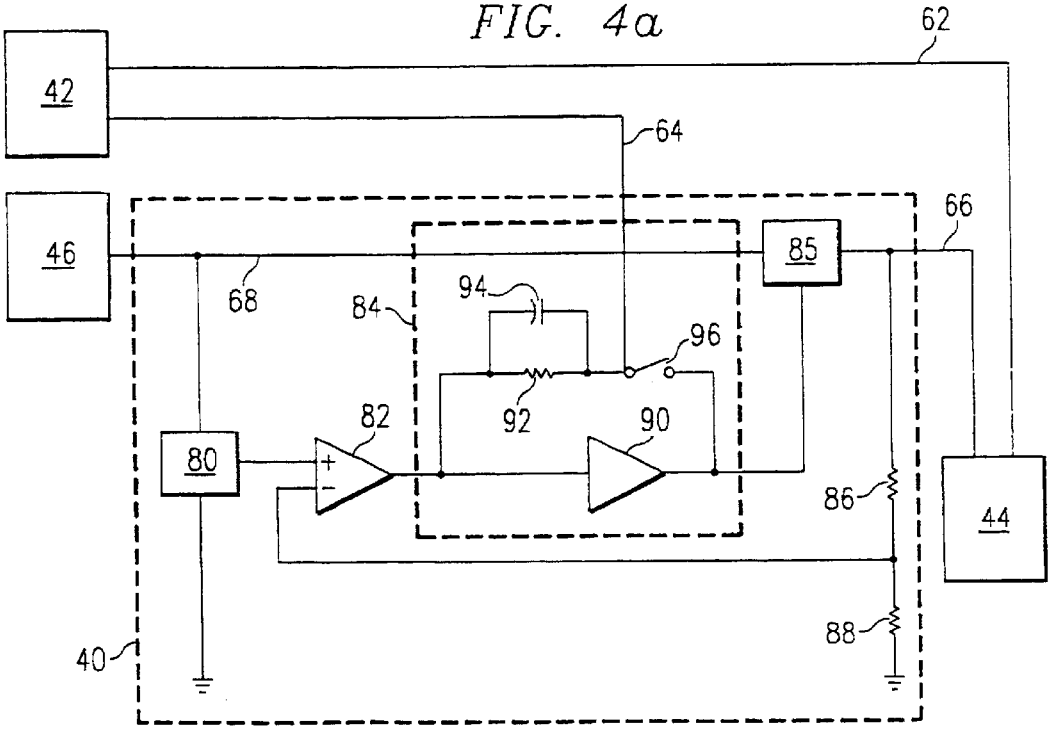
FIGS. 4a, 4b, and 4c are schematic diagrams of a voltage regulator formed according to embodiments of the present invention.

Referring to FIG. 4a, one embodiment of voltage regulator 40 with a regulating means for regulating the bandwidth is now described. A reference voltage generator 80 is connected between ground, the power source 46, and the non-inverting input of the error amplifier 82. The error amplifier 82 compares the voltage generated by the voltage reference 80 and a scaled output voltage of the voltage regulator 40. The error amplifier 82 drives the gain stage 84. The gain stage 84 drives the pass element 85. Resistors 86 and 88 form a voltage divider used to scale the output voltage of the voltage regulator 40 to allow it to be fed back to the inverting input of the error amplifier 82.

Figure 4B:
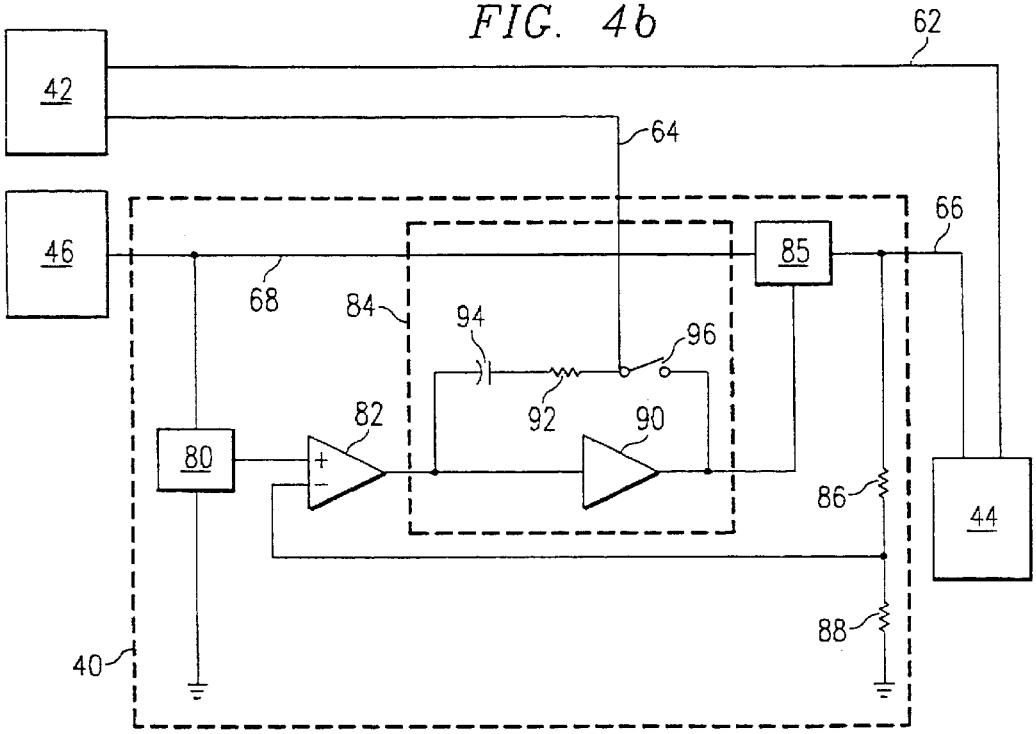
Figure 4C:
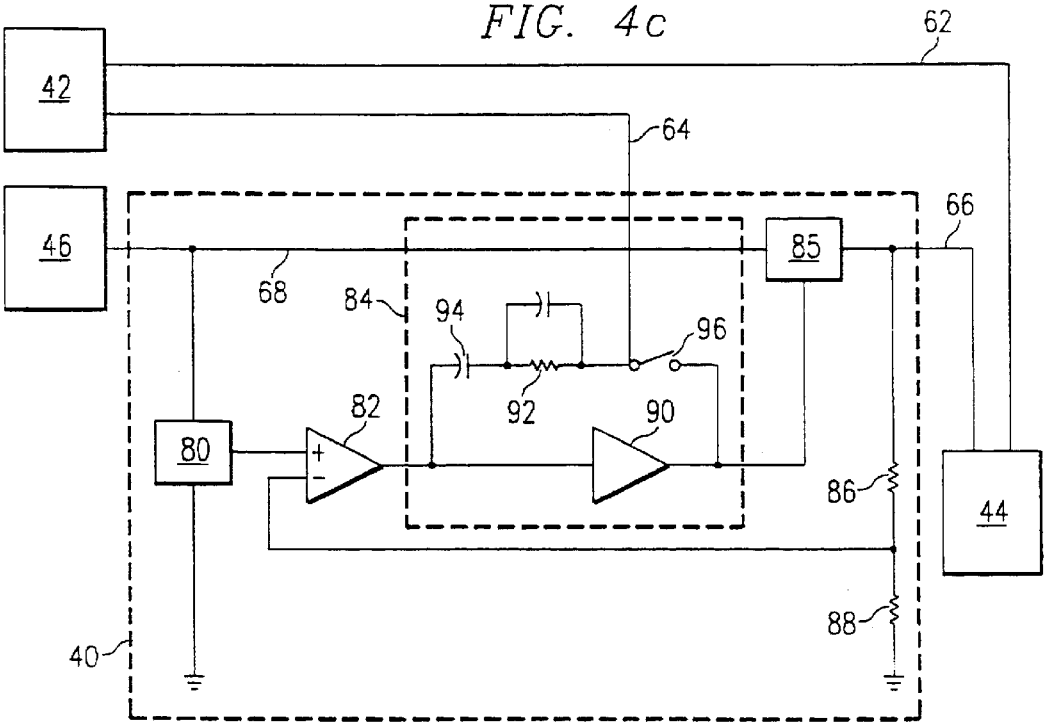

The regulating means is typically in the gain stage 84 of the voltage regulator 40. In this embodiment the gain stage 84 includes an amplifier 90, a resistor 92, and a first capacitor 94, configured as a differentiator. The first capacitor 94 is the compensation capacitor. The gain stage 84 also includes a first analog switch 96. In the preferred embodiment of the invention the analog switched is connected in the manner where it minimizes the charge injection of the analog switch 96. For example in the embodiment of the regulating means shown in FIG. 4a, the analog switch 96 is connected between the resistor 92 and the output of the amplifier 90. The first capacitor 94 compensates the voltage regulator 40 increasing its stability, but decreasing its bandwidth. At $t_2$ and $t_5$, when the control device 42 signals to the regulating means to change the bandwidth of the voltage regulator when the microprocessor is about to change levels of power consumption, the analog switch 96 is opened. This changes the bandwidth of the voltage regulator 40 to the second bandwidth, thereby shortening the time in which the voltage regulator 40 can begin to deliver the required voltage, i.e., reducing the transient response time. At $t_4$ and $t_8$, when the voltage regulator 40 is delivering required voltage, the analog switch 96 is closed, returning the bandwidth of the voltage regulator 40 to the first bandwidth. Although a differentiator is used in the example above, an integrator, as shown in FIG. 4b, or combination of a differentiator and integrator, as shown in FIG. 4c, can be used to control the bandwidth of the voltage regulator.

Figure 5:
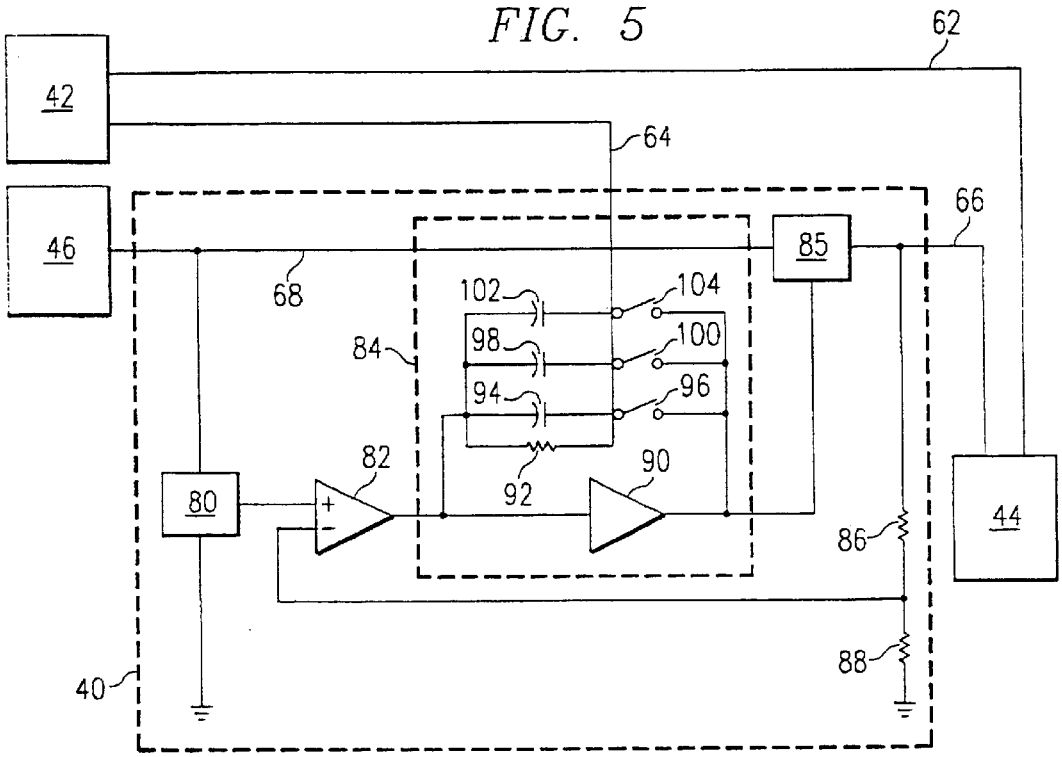
FIG. 5 is a schematic diagram of a voltage regulator formed according to another embodiment of the present invention.

In an alternative embodiment a second capacitor 98 is connected in parallel with the first capacitor 94, as illustrated in FIG. 5. A second analog switch 100 is connected the output of the amplifier 90 and the second capacitor 98. At $t_4$, when the voltage regulator 40 starts delivering the proper voltage, and it is preferable to leave the voltage regulator at the third bandwidth instead of the first bandwidth to insure that it continues delivering the required voltage, the second analog switch 100 instead of the first analog switch 96 is closed.

When different dynamic loads can be attached in turn to the output of the voltage regulator 40, additional capacitors 102 and analog switches 104 can be added. Since the bandwidth of the voltage regulator 40 varies based on the size of the compensation capacitor, the capacitors can be designed to tailor the bandwidth to the optimum bandwidth for a particular load, and the capacitor associated with a particular load can be switched in when a particular dynamic load 44 is attached. At $t_4$, when the voltage regulator 40 starts delivering required voltage, the analog switch corresponding to the capacitor than produces the optimum bandwidth for the particular dynamic load 44 is closed.

Figure 6:
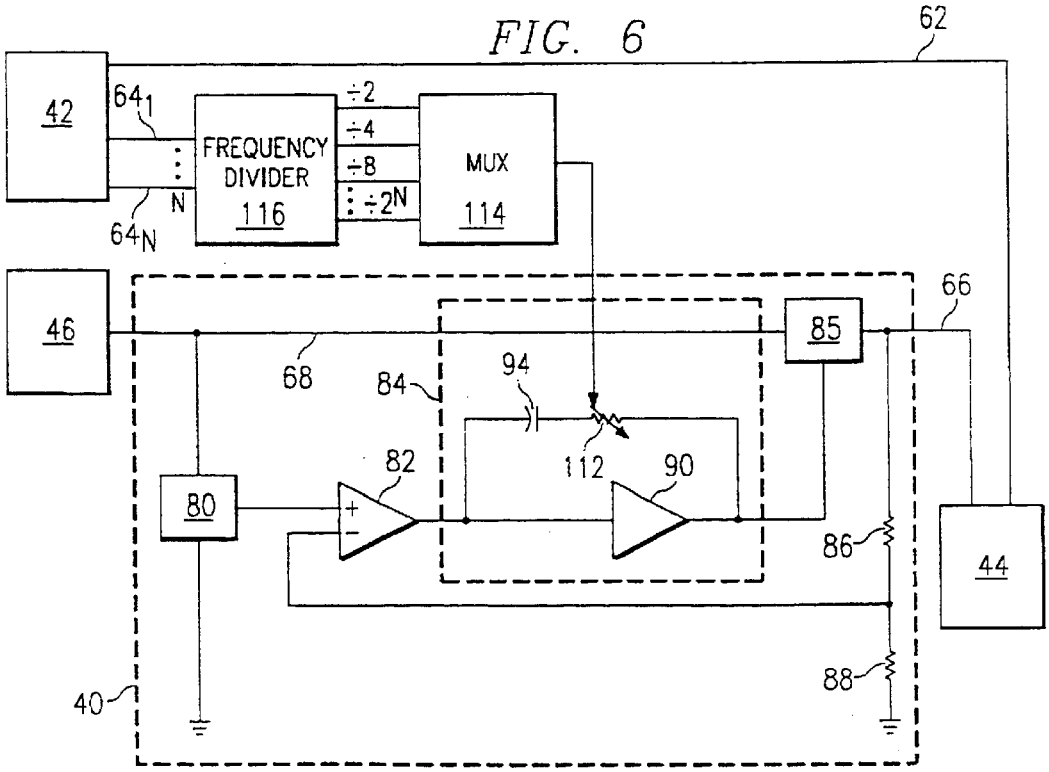
FIG. 6 is a schematic diagram of a voltage regulator formed according to another embodiment of the present invention.

Referring to FIG. 6, in another alternative embodiment of the invention, the regulating means includes a switched capacitor 112 connected between the first capacitor 94 and the output of the amplifier 90. A frequency divider 116 is connected via multiple lines $\mathbf{64}_1 \ldots \mathbf{64}_N$ to the control device 42. The number of lines connecting the frequency divider 116 and the control device 42 is equal the number of different dynamic loads that can be connected in turn to the voltage regulator. The frequency divider 116 controls the multiplexer 114, which in turn controls the switched capacitor 112. The operation of switched capacitors such as switched capacitor 112 is described in copending application Ser. No. 08/536,436 (Attorney's Docket No. 95-L-119) filed Sep. 29, 1995, incorporated herein by reference, said application assigned to SGS-THOMSON Microelectronics, Inc..

At $t_2$ and $t_5$ the control device 42 signals to the regulating means to change the bandwidth of the voltage regulator by changing the logic state on the line corresponding to the connected dynamic load 44. The frequency divider 116 supplies the multiplexer 114 with the frequency which will produce a bandwidth at which the transient response time would be shortest for the particular dynamic load 44, this will typically be a high frequency in order to produce a high bandwidth. The multiplexer 114 then sets the effective resistance of the switched capacitor 112 to this frequency. This changes the bandwidth of the voltage regulator 40 to the second bandwidth, thereby reducing the time it takes voltage regulator 40 to begin to deliver the required voltage, i.e., reducing the transient response time.

At $t_4$ and $t_8$, when the voltage regulator 40 is delivering required voltage, the control device 42 can again signal to the regulating means to change the bandwidth of the voltage regulator by changing the logic state on the line corresponding to the connected dynamic load 44. The frequency divider 116 supplies the multiplexer 114 with the frequency which will produce the optimal bandwidth for the particular dynamic load 44. The multiplexer 114 then sets the effective resistance of the switched capacitor 112 to this frequency, thereby changing the bandwidth of the voltage regulator 40 to either the first of third bandwidth.

Therefore the invention allows a quick response to the large increase or decrease in current required by the microprocessor 44 of a voltage regulator 40 when the microprocessor 44 is changing its level of power consumption. This is accomplished without compromising the stability of the voltage regulator 40. This s particularly advantageous for systems where a component can enter a power-down mode to reduce its power consumption, such as: battery operated systems where the reduction of power consumption will lead to an increase in battery life, "green" PCs designed to consume less power in an effort to allow more people access to computers without requiring an increase in generated power, and in an effort to preserve natural resources.

While the invention has been specifically described with reference to a preferred embodiment, it will be understood by those of ordinary skill in the prior art having reference to the current specification and drawings that various modifications may be made and various alternatives are possible therein without departing from the spirit and scope of the invention.

For example:

Although the control means is described as being a located outside of the microprocessor, it can be located inside the microprocessor but would remain active when the microprocessor is in the power-down mode.

Additionally, the control device can be any of the various microprocessor auxiliary chips, e.g. chips which include voltage or power-monitoring functions.

While the dynamic load is described as a microprocessor, any other component that can operate in at least two power consumption levels may be used.

Although only one power-down mode is described, the load can operate at several power-down modes.

While the voltage source is described as a battery, any power source may be used.

Additionally while the system is described using a linear voltage regulator a switched regulator may be used without departing from the scope of the invention.

Furthermore, while the invention is described with relation to a computer, the invention can be used in a the electrical system of an automobile, or any other system where a it is advantageous to place at least one of the system's component into a power-down mode to reduce the amount of power consumed by the system, without departing from the scope of the invention.

I claim:

1. The electronic system comprising:

at least one component capable of operating at either of at least two power consumption levels, having a power supply input, and a control input;

a control device for detecting that the component is to start and stop being accessed prior to the component being accessed based on an access signal, the control device having an access signal input, a first control output coupled to the control input of the component for signaling the component to switch from one power consumption level to another power consumption level, and a second control output for producing a control signal responsive to the access signal;

a power supply including:

a voltage regulator capable of operating with two or more bandwidths comprising:

a first input coupled to a power source;

a second input coupled to the second control output for receiving the control signal the voltage regulator switches from one bandwidth to another bandwidth responsive to the control signal received at the second input; and, an output coupled to the power supply input of the component.

2. The electronic system according to claim 1, wherein said power source further comprises a battery.

3. The electronic system according to claim 1, further comprising a sensing means for sensing if the component is about to be accessed, the sensing means having a sensing input, a first sensing output coupled to the control input of the component, and a second sensing output coupled to said second input of the voltage regulator.

4. The electronic system according to claim 3, further comprising a first notifying means for notifying the component to switch from one power consumption level to another power consumption level, the first notifying means having an input coupled to the first sensing output of the sensing means and an output coupled to the control input of the component.

5. The electronic system according to claim 3, further comprising a second notifying means for notifying the voltage regulator to switch from one bandwidth to another bandwidth, the second notifying means having an input coupled to the second sensing output of the sensing means and an output coupled to the second input of the voltage regulator.

6. The electronic system according to claim 1, wherein the component comprises a processor.

7. The electronic system according to claim 1, wherein the voltage regulator comprises a switched capacitor.

8. The electronic system according to claim 1, wherein the voltage regulator comprises:

a first compensation capacitor; and a first analog switch for bypassing the first compensation capacitor when the voltage regulator switches from one bandwidth to another bandwidth.

9. The electronic system according to claim 1, wherein the voltage regulator comprises:

a plurality of compensation capacitors, each compensation capacitor providing an optimum operating bandwidth for one of the components operating at a power consumption level higher than its lower power consumption level; and, a plurality of analog switches, each analog switch for bypassing one or more of the compensation capacitors when the voltage regulator switches from one bandwidth to another bandwidth.

10. The electronic system according to claim 1, wherein the control device is integrated into the component.

11. A voltage regulator capable of operating with two or more bandwidths comprising:

a first input;

an output coupled to a dynamic load capable of operating at either of at least two power consumption levels responsive to an access signal;

a second input for receiving a control signal for switching the operation of the voltage regulator from one bandwidth to another bandwidth; and a regulating means coupled to the second input for changing the bandwidth of the voltage regulator responsive to the control signal, wherein the control signal is responsive to the access signal.

12. The voltage regulator according to claim 10, wherein said second input is coupled to a control device.

13. The voltage regulator according to claim 10, wherein the regulating means comprises a switched capacitor.

14. The voltage regulator according to claim 10, wherein the regulating means comprises:

a first compensation capacitor; and a first analog switch for bypassing the first compensation capacitor when the regulating means is changing the bandwidth of said voltage regulator from one bandwidth to another bandwidth.

15. The voltage regulator according to claim 11, wherein the regulating means comprises:

a plurality of compensation capacitors, each compensation capacitor providing an optimum operating bandwidth for one of said components operating at a power consumption level higher than its lowest power consumption level; and, a plurality of analog switches, each analog switch for bypassing one or more of the compensation capacitors when the regulating means is changing the bandwidth of the voltage regulator from one bandwidth to another bandwidth.

16. The voltage regulator according to claim 11, wherein said first input is coupled to a voltage source.

17. The voltage regulator according to claim 11, wherein the dynamic load comprises a processor.

18. A computer comprising:

a voltage regulator capable of operating with two or more bandwidths comprising a first input, a second input, an output, and a regulating means coupled to the second input for stabilizing the voltage regulator by switching from one bandwidth to another bandwidth responsive to a control signal;

a dynamic load, having a power supply input coupled to the output, and a control input, the dynamic load capable of operating at either of at least two levels of power consumption; and, a control device for detecting changes in operating conditions of the computer, and having a first control output coupled to said control input of the dynamic load, and a second control output coupled to said second input of said voltage regulator;

wherein said regulating means changes the bandwidth of said voltage regulator responsive to the control device detecting the dynamic load is going to start and stop being accessed.

19. The computer of claim 18, wherein one of said levels of power consumption is a power-down level.

20. The computer of claim 18, wherein the regulating means comprises a switched capacitor.

21. The computer of claim 18, wherein the regulating means comprises a first analog switch for bypassing a first compensation capacitor of said voltage regulator when said regulating means is changing the bandwidth of said voltage regulator.

22. The voltage regulator according to claim 18, wherein the regulating means comprises:

a plurality of compensation capacitors, each compensation capacitor providing an optimum operating bandwidth for one of said components operating at a power consumption level higher than its lowest power consumption level; and, a plurality of analog switches, each analog switch for bypassing one or more of the compensation capacitors when the regulating means is changing the bandwidth of the voltage regulator from one bandwidth to another bandwidth.

23. The computer of claim 18, wherein the dynamic load comprises a processor.

24. The computer according to claim 18, wherein the control device is integrated into the dynamic load.

25. A method for regulating the voltage of an electronic system having a voltage regulator and at least one component capable of operating at either of at least two levels of power consumption, the component having a power supply input coupled to an output of the voltage regulator, comprising:

detecting that the component is about to start and stop being accessed;

changing the bandwidth of the voltage regulator from a first bandwidth to a second bandwidth responsive to detecting that the component is about to start and stop being accessed;

changing the level of power consumption of the component from a first power consumption level to a second power consumption level.

26. The method of claim 25, further comprising the steps of:

detecting that the voltage regulator is delivering the voltage required by the component, performed after the step of changing the level of power consumption of the component from the first power consumption level to the second power consumption level; and changing the bandwidth of the voltage regulator from the second bandwidth to the first bandwidth.

27. The method of claim 25, further comprising the steps of:

detecting that the voltage regulator is delivering the voltage required by the component, performed after the step of changing the level of power consumption of the component from the first power consumption level to the second power consumption level;

changing the bandwidth of the voltage regulator from the second bandwidth to a third bandwidth.

28. The method of claim 27, further comprising the steps of:

detecting that the component is about to start and stop being accessed;

changing the bandwidth of the voltage regulator from the third bandwidth to the second bandwidth; and changing the level of power consumption of the component from the third power consumption level to the second power consumption level.

29. The method of claim 25, wherein the steps of changing the bandwidth of the voltage regulator from a first bandwidth to a second bandwidth and changing the level of power consumption of the component from a first power consumption level to a second power consumption level are performed concurrently.

*30. An electronic system, comprising:*

*a component operable to receive a power signal and a first control signal, the component operable to change from operating at a first power-consumption level to operating at a second power-consumption level in response to the first control signal;*

*a controller coupled to the component and operable to receive a component-access signal and to generate the first control signal and a second control signal in response to the component-access signal; and*

*a power regulator coupled to the component and to the controller and operable to generate the power signal and to change from operating at a first bandwidth to operating at a second bandwidth in response to the second control signal.*

*31. The electronic system of claim 30 wherein the controller is operable to generate the second control signal before the first control signal.*

* * * * *